(12) United States Patent
Baksh et al.

(10) Patent No.: US 6,503,299 B2
(45) Date of Patent: *Jan. 7, 2003

(54) PRESSURE SWING ADSORPTION PROCESS FOR THE PRODUCTION OF HYDROGEN

(75) Inventors: Mohamed Safdar Allie Baksh, Amherst, NY (US); Charles Edward Terbot, Tonawanda, NY (US)

(73) Assignee: Praxair Technology, Inc., Danbury, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/432,215

(22) Filed: Nov. 3, 1999

(65) Prior Publication Data

US 2002/0014153 A1 Feb. 7, 2002

(51) Int. Cl.$^7$ ............................................. B01D 53/053
(52) U.S. Cl. .............................. 95/98; 95/100; 95/103; 95/117; 95/130; 95/139; 95/140; 95/143
(58) Field of Search ....................... 95/96–98, 100–105, 95/117, 130, 139, 140, 143

(56) References Cited

U.S. PATENT DOCUMENTS

| | | | |
|---|---|---|---|
| 3,430,418 A | | 3/1969 | Wagner ........................ 55/25 |
| 3,564,816 A | | 2/1971 | Batta ........................... 55/26 |
| 3,788,036 A | * | 1/1974 | Lee et al. ..................... 95/101 |
| 3,977,845 A | * | 8/1976 | Walter ......................... 95/100 |
| 4,077,779 A | * | 3/1978 | Sircar et al. .................. 55/25 |
| 4,171,206 A | | 10/1979 | Sircar ......................... 55/26 |
| 4,440,548 A | | 4/1984 | Hill ............................ 55/26 |
| 4,553,981 A | * | 11/1985 | Fuderer ....................... 48/62 R |
| 4,816,039 A | * | 3/1989 | Krishnamurthy et al. ....... 95/97 |
| 4,859,217 A | * | 8/1989 | Chao .......................... 55/68 |
| 4,957,514 A | | 9/1990 | Golden et al. ................. 55/26 |
| 5,032,150 A | * | 7/1991 | Knaebel ...................... 95/98 X |
| 5,152,975 A | * | 10/1992 | Fong et al. ................... 423/652 |

(List continued on next page.)

FOREIGN PATENT DOCUMENTS

| | | |
|---|---|---|
| JP | 03021315 | 1/1991 |
| WO | WO97/45363 A1 | 12/1997 |

*Primary Examiner*—Robert H. Spitzer
(74) *Attorney, Agent, or Firm*—Robert J. Follett

(57) ABSTRACT

This invention provides a two bed pressure swing adsorption process for recovering a primary gaseous component at a purity of over 99% from a feed gas comprising the primary component and one or more impurities. One such process includes: (a) passing the feed gas through a first adsorption bed to remove one or more impurities; (b) conducting a pressure swing adsorption cycle in the first bed; (c) separately passing effluent gases from the first bed into at least two separate tanks for subsequent purging and pressurization of the beds; (d) storing a gas mixture in the first of the tanks containing the primary component in a concentration higher than the concentration of the primary component in the gas mixture in the second of the tanks; (e) refluxing the mixture of the primary component from the second tank in the first adsorption bed during the regeneration steps therein; (f) refluxing the mixture of the primary component from the first tank in the first adsorption bed during the regeneration steps therein; (g) simultaneously and non-concurrently performing steps (a) to (f) in a second bed; and (h) recovering the product gas stream.

19 Claims, 14 Drawing Sheets

U.S. PATENT DOCUMENTS

| | | | |
|---|---|---|---|
| 5,174,979 A | * 12/1992 | Chao et al. | 423/715 |
| 5,294,247 A | 3/1994 | Scharpf et al. | 95/100 |
| 5,370,728 A | * 12/1994 | LaSala et al. | 95/101 |
| 5,413,625 A | * 5/1995 | Chao et al. | 95/103 |
| 5,454,857 A | * 10/1995 | Chao | 95/96 |
| 5,518,526 A | * 5/1996 | Baksh et al. | 95/100 |
| 5,538,706 A | * 7/1996 | Kapoor et al. | 423/418.2 |
| 5,620,501 A | * 4/1997 | Tamhankar et al. | 95/96 X |
| 5,698,013 A | * 12/1997 | Chao | 96/108 |
| 5,702,504 A | * 12/1997 | Schaub et al. | 95/101 |
| 5,735,938 A | * 4/1998 | Baksh et al. | 95/101 |
| 5,753,010 A | 5/1998 | Sircar et al. | 95/45 |
| 5,846,294 A | * 12/1998 | Doong | 95/98 |
| 5,906,674 A | * 5/1999 | Tan et al. | 95/98 |
| 5,964,924 A | 10/1999 | Engler et al. | 95/98 |
| 6,007,606 A | * 12/1999 | Baksh et al. | 95/98 |
| 6,048,384 A | * 4/2000 | Smolarek | 95/98 |
| 6,071,328 A | * 6/2000 | Petit et al. | 95/98 |

* cited by examiner

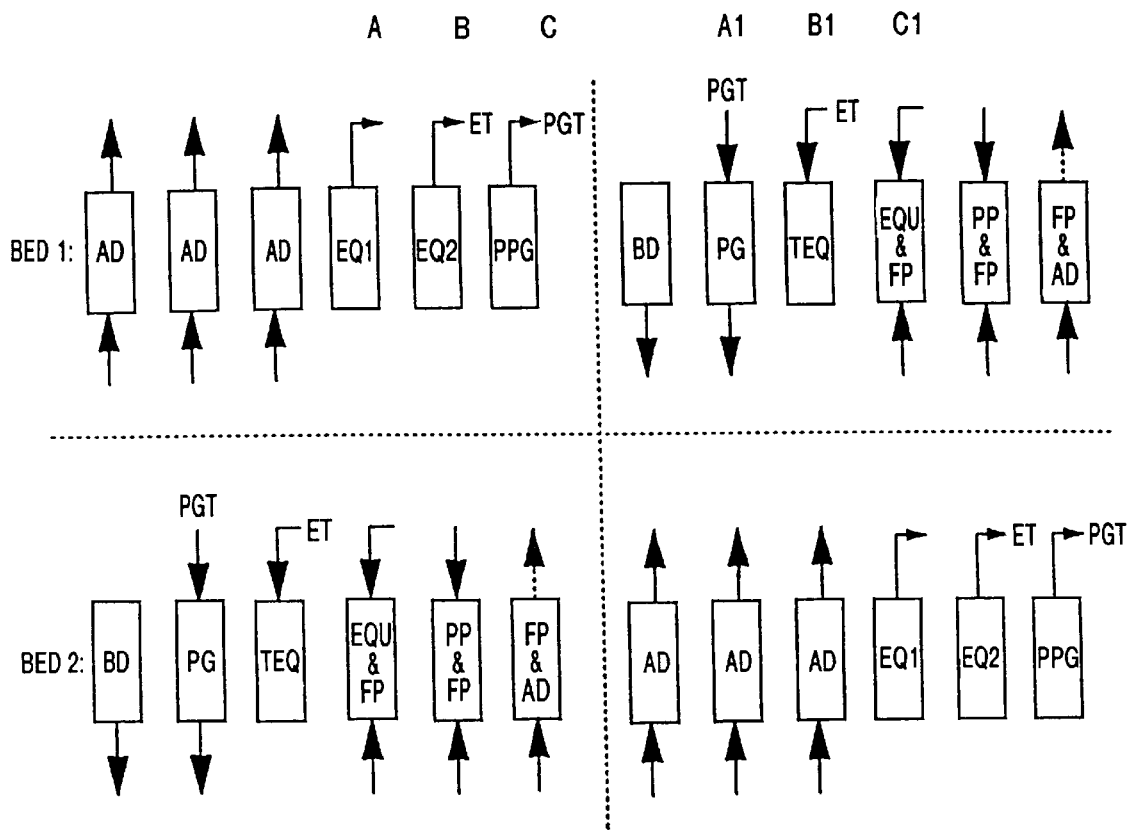

Two Bed PSA Column Cycle Using Product Pressurization and the PSA Process of Figure 3.

AD = Adsorption
EQ1 = First Equalization Down
EQ2 = Second Equalization Using Equalization Tank (ET)
PPG = Provide Purge Gas Using Purge Tank (PGT)
BD = Blowdown
PG = Purge
PGT = Purge Tank
ET = Equalization Tank
TEQ = Tank Equalization (ET) With Bed
EQU = Equalization UP (Bed-to-Bed)
PP = Product Pressurization (PP)
FP = Feed Pressurization

FIG. 4

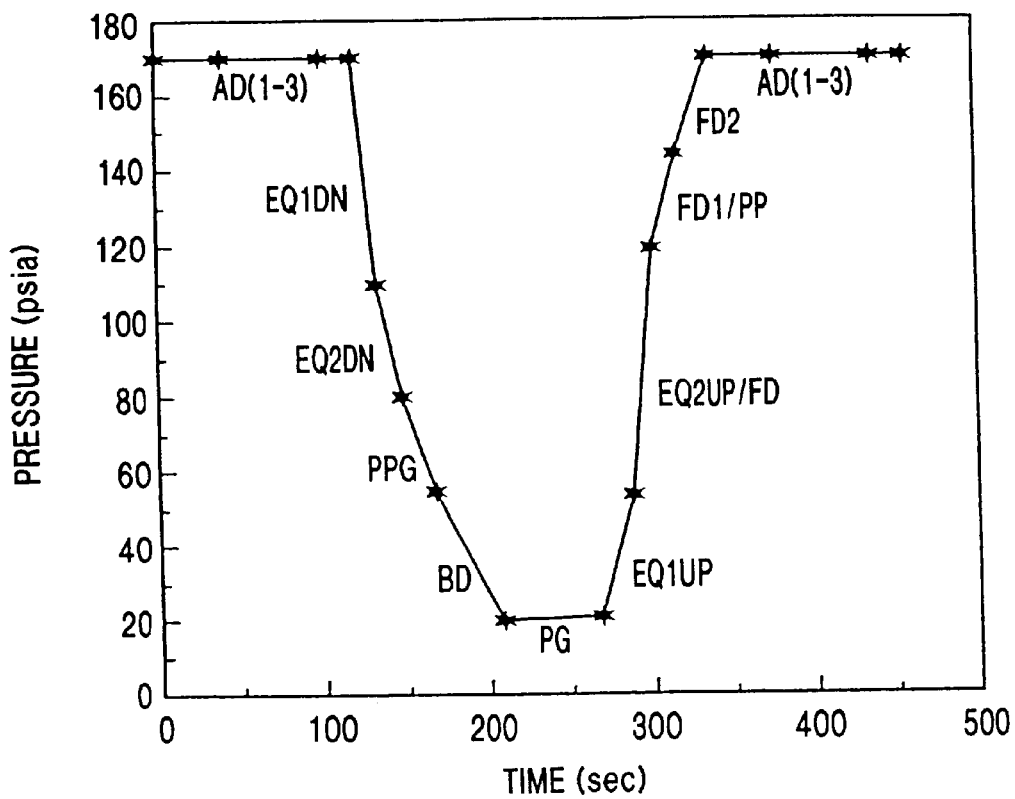

Bed Pressure Profile During One Complete Cycle Using the Two Bed PSA Process of Figure 3 and the PSA Cycle of Figure 4.

AD (1-3) = Adsorption (AD1, AD2, and AD3)
EQ1DN = First Equalization Down
PPG = Provide Purge Gas
EQ2DN = Second Equalization Down
BD = Blowdown
PG = Purge
EQ1UP = First Equalization UP
EQ2UP/FD = Second Equalization UP With Feed Overlap
FD1/PP = First Feed Pressurization With Product Pressurization Overlap
FD2 = Second Feed Pressurization

FIG. 5

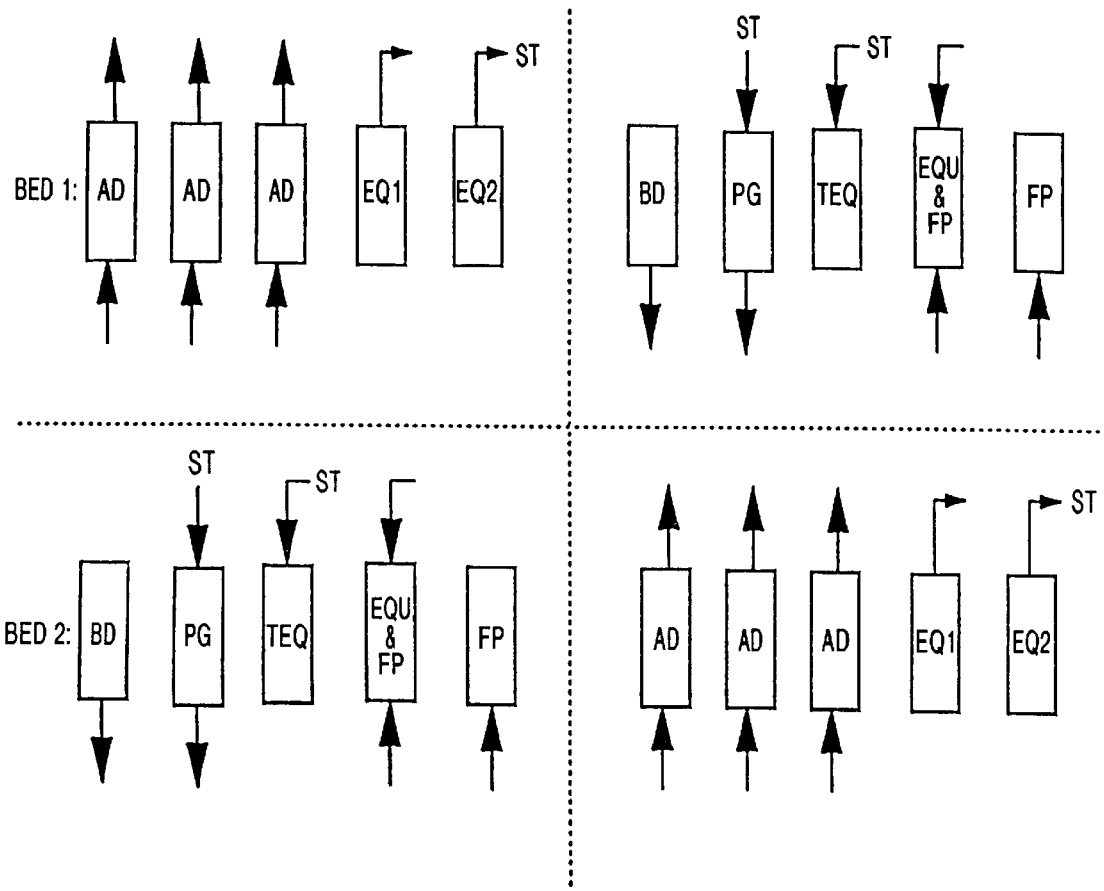

Alternative Two Bed PSA Column Cycle With Ten Steps and Using the Two Bed PSA Process of Process of Figure 8 (Residual Gas After Purging is Used for First Equalization UP).

AD = Adsorption
EQ1 = First Equalization Down
EQ2 = Second Equalization Using Tank (ST)
BD = Blowdown
PG = Purge
TEQ = Tank Equalization with Bed
EQU = Equalization UP (Bed-to-Bed)
FP = Feed Pressurization

FIG. 9

Four Bed PSA Column Cycle With Twelve Steps.

AD = Adsorption
EQ1D = First Equalization Down
PPG = Provide Purge Gas
EQ2D = Second Equalization Down
BD = Blowdown
PG = Purge
EQ1U = First Equalization UP
EQ2U = Second Equalization UP
PP1 = First Product Pressurization Using R1 Gas (R1G)
PP2 = Second Product Pressurization Using R2 Gas (R2G)

AD (1-3) = Adsorption (AD1, AD2, and AD3)
EQ1DN = First Equalization Down
PPG = Provide Purge Gas
EQ2DN = Second Equalization Down
BD = Blowdown
PG = Purge
EQ1UP = First Equalization UP
EQ2UP = Second Equalization UP
PP1 = First Product Pressurization
PP2 = Second Product Pressurization

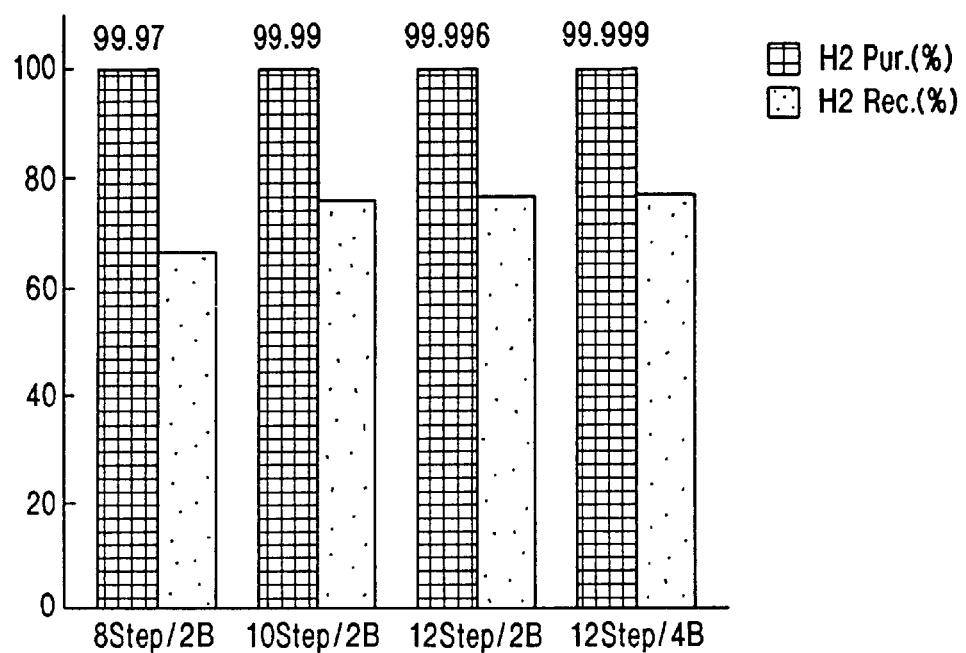
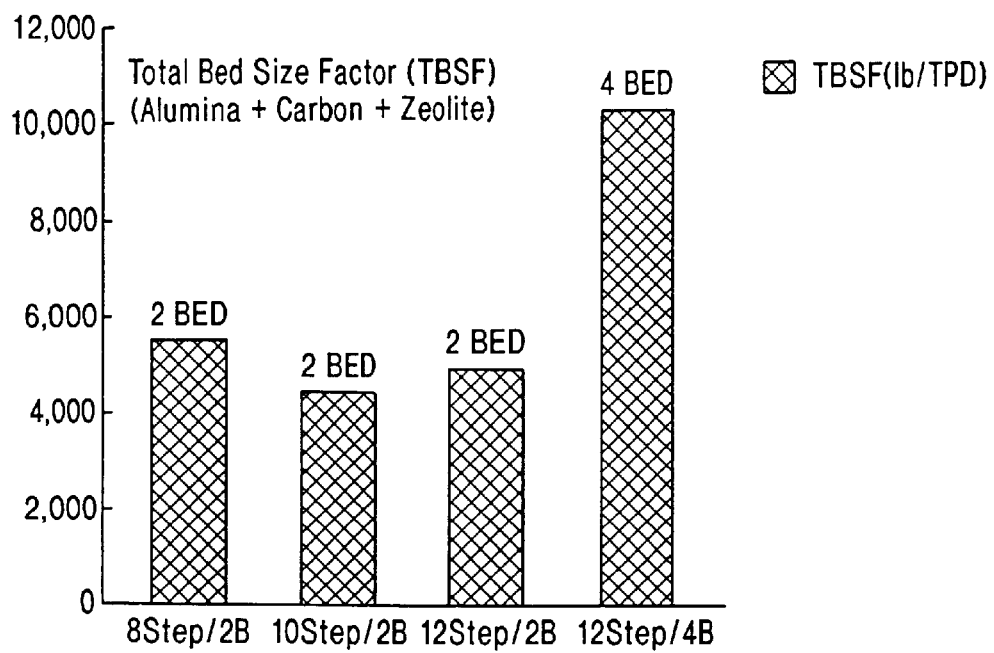
FIG. 14

US 6,503,299 B2

PRESSURE SWING ADSORPTION PROCESS FOR THE PRODUCTION OF HYDROGEN

FIELD OF THE INVENTION

This invention relates to a two-bed pressure swing adsorption (PSA) process for purifying impure gas streams containing more than 50 mole % hydrogen, and more particularly to such a process for the production of high purity hydrogen from various hydrogen-containing feed mixtures such as synthesis gas. The process provides higher hydrogen recoveries and requires fewer adsorption beds than previously known PSA processes for hydrogen production.

BACKGROUND OF THE INVENTION

The need for high purity (>99.9%) hydrogen is growing in the chemical process industries, e.g., in steel annealing, silicon manufacturing, hydrogenation of fats and oils, glass making, hydrocracking, methanol production, the production of oxo alcohols, and isomerization processes. This growing demand requires the development of highly efficient separation processes for $H_2$ production from various feed mixtures. In order to obtain highly efficient PSA separation processes, both the capital and operating costs of the PSA system must be reduced.

One way of reducing PSA system cost is to decrease the adsorbent inventory and number of beds in the PSA process. In addition, further improvements may be possible using advanced cycles and adsorbents in the PSA process. However, $H_2$ feed gas contains several contaminants, e.g. a feed stream may contain $CO_2$(20% to 25%) and minor amounts of $H_2O$ (<0.5%), $CH_4$(<3%), CO(<1%) and $N_2$ (<1%). Such a combination of adsorbates at such widely varying compositions presents a significant challenge to efficient adsorbent selection, adsorbent configuration in the adsorber, and the choices of individual adsorbent layers and multiple adsorbent bed systems to obtain an efficent $H_2$-PSA process.

There are a variety of known processes for producing hydrogen. For example, FIG. 1 of the accompanying drawing shows the steam reforming of natural gas or naptha wherein a feedstock, e.g., a natural gas stream 11, is compressed and fed to a purification unit 12 to remove sulfur compounds. The desulfurized feed is then mixed with superheated steam and fed to a reformer 13 to produce primarily $H_2$ and CO. The effluent stream from the reformer is sent to a heat recovery unit 14, then to a shift converter 15 to obtain additional $H_2$. The effluent from the shift converter goes through a process cooling and recovery unit 16 prior to sending the effluent (e.g., a synthesis gas stream 17 having on a dry basis a composition of about 74.03% $H_2$, 22.54% $CO_2$, 0.36% CO, 2.16% $CH_4$, and 0.91% $N_2$) to a PSA purification system 18 to produce a high purity hydrogen product stream 19.

Representative prior art PSA processes for hydrogen purification include the following: (1) Wagner, U.S. Pat. No. 3,430,418, (2) Batta, U.S. Pat. No. 3,564,816, (3) Sircar et al., U.S. Pat. No. 4,077,779, (4) Fuderer et al., U.S. Pat. No. , 4,553,981, (5) Fong et al, U.S. Pat. No. 5,152,975, (6) Kapoor et al., U.S. Pat. No. 5,538,706, (7) Baksh et al., U.S. Pat. No. 5,565,018, and (8) Sircar et al., U.S. Pat. No. 5,753,010.

Wagner, U.S. Pat. No. 3,430,418 describes an eight-step PSA cycle for hydrogen purification. At least four beds are used in the process; following the bed-to-bed equalization step each bed undergoes a co-current depressurization step prior to countercurrent blowdown to recover void space gas for purging of another bed.

Batta, U.S. Pat. No. 3,564,816 describes a twelve-step step PSA cycle using at least four adsorbent beds and two pressure equalization stages for separating hydrogen-containing gas mixtures contaminated with $H_2O$, $C_2O$, $CH_4$ and CO produced in steam reforming of natural gas. In the Batta process, after the first bed-to-bed equalization step, a co-current depressurization step is used to recover void space gas for purging of another bed, then a second bed-to-bed equalization step is used prior to the countercurrent blowdown step in the PSA cycle.

Scharpf et al., U.S. Pat. No. 5,294,247 discloses a vacuum PSA process for recovering hydrogen from dilute refinery off gases, preferably containing less than 60% hydrogen. The patent discloses the use of six adsorbent beds. Baksh et al., U.S. Pat. No. 5,565,018 discloses a 12 bed PSA process using external gas storage tanks to allow gases of increasing purity to be used during repressuzation.

Sircar et al., U.S. Pat. No. 5,753,010 discloses a PSA hydrogen recovery system where a portion of the hydrogen is recovered from the PSA depressurization and recycled to the PSA system.

Baksh, U.S. application Ser. No. 09/373,749 (D-20731), for Pressure Swing Adsorption Process for the Production of Hydrogen, filed Aug. 13, 1999 discloses a pressure swing adsorption process for purifying an impure gas stream by passing it through an adsorbent bed containing an alumina layer for adsorption of $H_2O$, an activated carbon layer for adsorption of $CH_4$, $CO_2$, and CO, and a layer containing the zeolite for adsorption of nitrogen from the gas stream. The pressure swing adsorption process provided in the Baksh application is a 4 bed system employing a 12 step process (see inter alia pages 12–14). The invention described in the present application differs in several important respects from the process disclosed in the Baksh application. These differences include, but are not limited to, the fact that the present invention uses a 2 bed system which allows for a reduction in the bed size factor; and in several embodiments, the present invention uses storage tanks (separate from the adsorption beds) which allow for the use of gas of increasing $H_2$ purity during refluxing.

It is among the objects of the present invention to provide an improved PSA process for the production of hydrogen from an impure gas stream containing more than 50 mole % hydrogen, which provides increased hydrogen recovery and reduced PSA adsorbent requirements with consequent lower capital and operating costs. Other objects and advantages of the invention will be apparent from the following description taken in connection with the accompanying drawing.

SUMMARY OF THE INVENTION

This invention provides a two bed pressure swing adsorption process (as distinguished from the four or more bed processes utilized in prior art designs) for recovering a primary component (e.g. hydrogen) at a purity of over 99% from a feed gas, e.g., synthesis gas, comprising the primary component and one or more impurities. The process is capable of producing high purity (>99.99%) hydrogen at high recoveries with a significant reduction in the total cycle time versus prior art PSA processes used in $H_2$ production.

This invention includes a two bed pressure swing adsorption process for recovering a primary component at a purity of over 99% from a feed gas comprising the primary component and one or more impurities, wherein the process comprises: (a) passing the feed gas through a first adsorption bed to remove one or more impurities; (b) conducting a pressure swing adsorption cycle in the first bed; (c) separately passing effluent gases from the first bed into at least two separate tanks for subsequent purging and pressurization of the beds; (d) storing a gas mixture in the first of the tanks containing the primary component in a concentration higher than the concentration of the primary component in the gas mixture in the second of the tanks; (e) refluxing the mixture of the primary component from the second tank in the first adsorption bed during the regeneration steps therein; (f) refluxing the mixture of the primary component from the first tank in the first adsorption bed during the regeneration steps therein; (g) simultaneously and non-concurrently performing steps (a) to (f) in a second bed; and (h) recovering the product gas stream.

In accordance therewith, decreased adsorbed inventories are required (without decreasing the $H_2$ product purities and recoveries), greater flexibility in controlling the duration and the pressures and end points of each step are achieved, and significant reductions (>45%) in the amount of the adsorbent (e.g. zeolite) in the purification zone of each adsorbent bed are obtained.

The process of the present invention can handle a continuous feed and utilize several overlapping steps in the PSA cycle. Generally the feed gas will contain $H_2$, CO, $CO_2$, $CH_4$, $N_2$, and $H_2O$, and $H_2$ as the primary component.

Preferably, these processes utilize storage tanks to collect gas from certain steps in the PSA cycle, and then utilize the gas at a later time for purging and pressurization. The gases collected in the storage tanks are used in the order of increasing $H_2$ purity for refluxing of a bed that is undergoing regeneration.

In one variation, the first and second beds each comprise an alumina layer at the feed end of the bed, a zeolite layer at the product end of the bed, and a carbon layer between the alumina layer and the zeolite layer. Suitable zeolites include, but are not limited to, CaX zeolite and VSA6 zeolite.

Suitable zeolites include, but are not limited to, CaX, VSA6, 5A, Li-X, 13X, and LiA. CaX zeolites, most desirably CaX (2.0), are particularly preferred. CaX (2.0) is a zeolite of the faujasite type exchanged at least 90% with calcium and having a $SiO_2/Al2O_3$ molar ratio of 2.0. CaX (2.0) processes more feed gas per unit weight of adsorbent at a given P/F (purge to feed) ratio than other $N_2$-selective adsorbents. Other useful Ca-exchanged zeolites may be prepared from naturally occurring crystalline zeolite molecular sieves such as chabazite, erionite and faujasite. Alternatively, the CaX zeolites useful herein include mixed cation (e.g. $Ca^{2+}$ and $Na^+$) zeolites such as VSA-6 developed by UOP of Des Plaines, Ill. with 74% $Ca^{2+}$ and a $SiO_2/Al_2O_3$ ratio of 2.3. LiA and LiX zeolites having $SiO_2/Al_2O_3$ ratios within the range of 2.0–2.5 are also useful in the practice of the present invention. Other adsorbents useful herein include mixed lithium/alkaline earth metal Type A and Type X zeolites having $SiO_2/Al_2O_3$ molar ratios in the range of 2.0–2.5 such as CaLiX (2.3), having calcium contents of 15–30% (see Chao et al, U.S. Pat. Nos. 5,413,625; 5,174,979; 5,698,013; 5,454,857 and 4,859,217). The zeolite disclosures of the foregoing patents are incorporated by reference herein.

BRIEF DESCRIPTION OF THE DRAWING

In the accompanying drawing:

FIG. 4 is a schematic drawing of the 12 step PSA cycle utilizing product pressurization in the 2 bed PSA system of FIG. 3.

FIG. 5 is a graphic depiction of the bed pressure profile during one complete cycle in the two-bed PSA system of FIG. 3, utilizing the 12 step cycle illustrated in FIG. 4.

FIG. 9 is a schematic drawing of a 10 step PSA cycle utilizing the two bed system of FIG. 8, wherein the residual gas after purging is used for the first equalization.

FIG. 14 is a graphic comparison of the hydrogen purities and recoveries obtained with the 8-step 2-bed, 10-step 2-bed, 12-step 2-bed, and 12-step 4-bed PSA processes described.

DETAILED DESCRIPTION OF THE INVENTION

Figure 1:
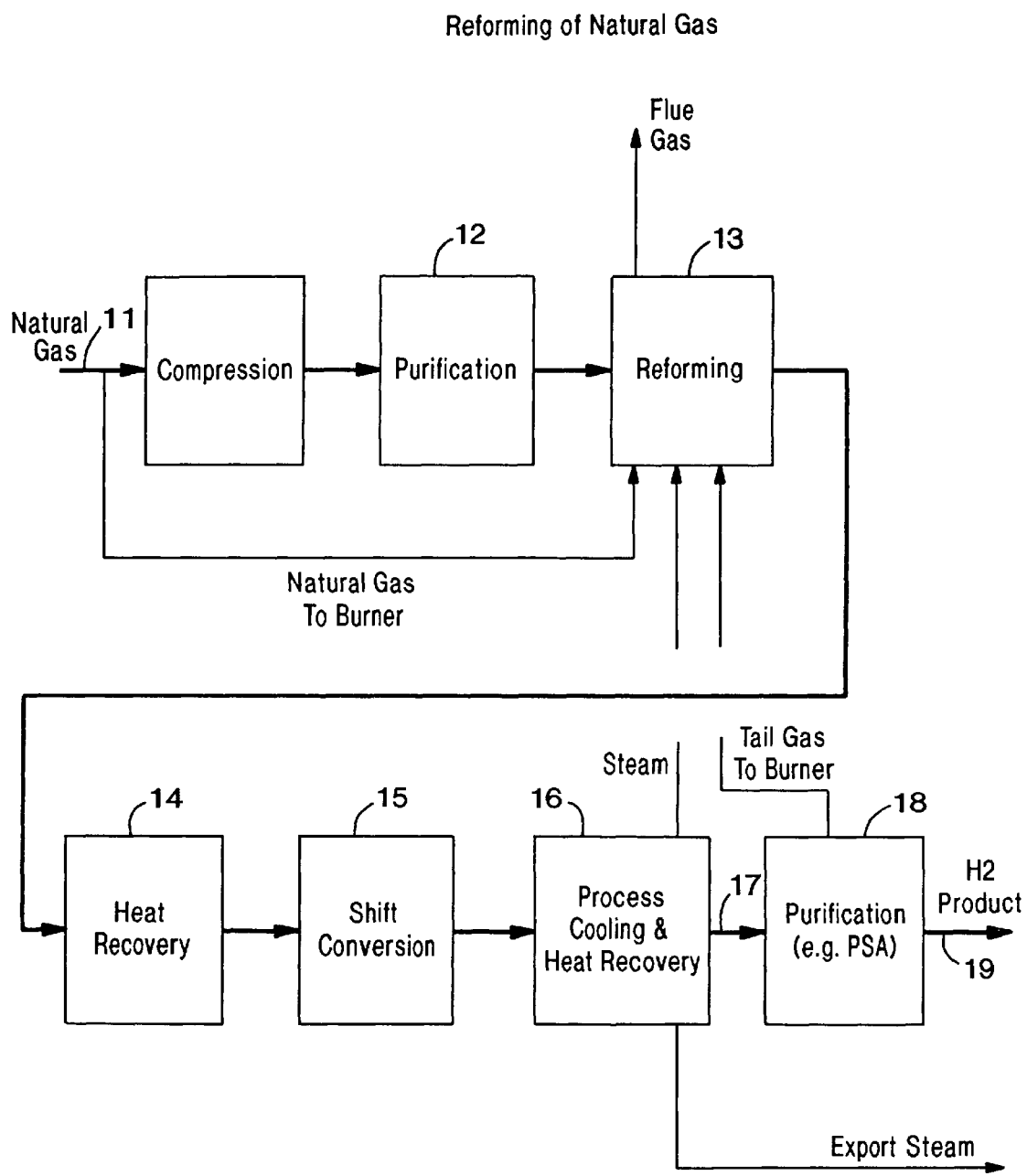
FIG. 1 is a schematic illustration of the prior art technique for the production of hydrogen by the steam reforming of natural gas.
Figure 2:
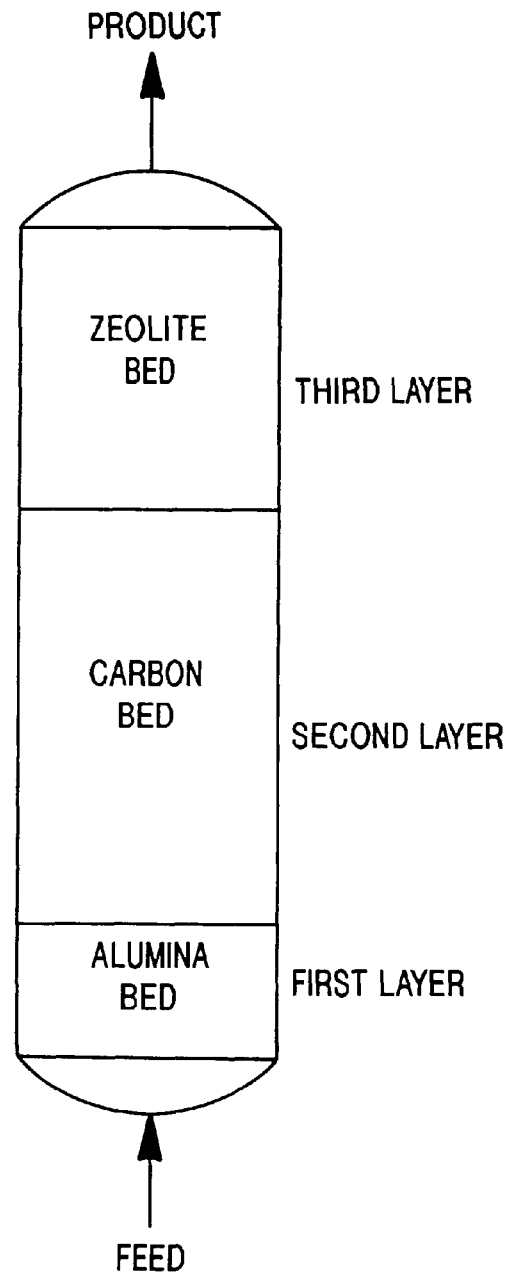
FIG. 2 is a schematic drawing of a PSA adsorption bed utilized in the practice of the present invention.

As pointed out above, the present invention includes novel two-bed PSA processes that are capable of handling continuous gas feeds and produce high purity (>99.99%) hydrogen at high recoveries with a significant reduction in the total cycle time versus prior PSA processes used in $H_2$ production. The two bed PSA cycles of this invention also provide more flexibility in controlling the duration and the pressure end points of the PSA steps versus four bed prior art processes, and thus require less bed synchronization. Further, the two bed process of the invention uses product gas of increasing purity for refluxing during bed regeneration, and requires a reduced number of valves and piping, resulting in a less complex, less costly process with increased portability. In addition, because of the smaller void volume, due to the reduction in bed size factor, less hydrogen is lost during the regeneration of the bed and higher $H_2$ recoveries result. These processes can handle a continuous feed and utilize several overlapping steps in the PSA cycle. For example, the two bed PSA cycles may utilize feed overlapping with equalization steps, and feed overlapping with product pressurization steps to produce high purity hydrogen from a feed mixture such as synthesis gas. Preferably, these processes utilize storage tanks to collect gas from certain steps in the PSA cycle, and then utilize the gas at a later time for purging and pressurization. The gases collected in the storage tanks are used in the order of increasing $H_2$ purity for refluxing of a bed that is undergoing regeneration.

A. The Embodiment of FIGS. 3–5

This invention will initially be described with reference to the two bed PSA system shown in FIG. 3, the 12 steps PSA cycle shown in FIG. 4, and the bed pressure profile depicted in FIG. 5. Referring to those figures, the following 12 step cycle is illustrated. Note that the references in the Figures to "PV" valves (e.g. one or more of PV-1, PV-2, PV-3 and PV-4) in FIGS. 3, 6, 8 and 11) are process control valves.

Step 1 (AD1): Bed 1 (B1) is in the first adsorption step (AD1) at 11.72 bars, while bed 2 (B2) is undergoing countercurrent blowdown (BD).

Step 2 (AD2 ): Bed 1 is in the second adsorption step (AD2), and at the same time, bed 2 is undergoing the purging step. The gas used for purging comes from the purge tank (PGT) in FIG. 3.

Step 3 (AD3): Bed 1 is in the third adsorption step (AD3), and at the same time, bed 2 is undergoing the first pressurization step, i.e., bed-to-tank equalization (TEQ). The gas used for the first pressurization comes from the equalization tank (ET) in FIG. 3.

Step 4 (EQ1): Bed 1 is undergoing the first equalization falling step (EQI), while bed 2 receives gas from bed 1 and is undergoing the second equalization rising step (EQU). In addition, bed 2 is also receiving feed gas during the second equalization rising step.

Step 5 (EQ2): Bed 1 is undergoing the second equalization falling step (EQ2). The gas recovered in this step is collected in the equalization tank (ET). At the same time, bed 2 is undergoing both feed pressurization (FP) and product pressurization (PP). The gas for product pressurization comes from the product tank (PT) in FIG. 3. The product pressurization provides additional refluxing gas beyond that produced using the purging and equalization rising steps. The pressurization also improves mass transfer in the purification zone to provide higher hydrogen purity.

Step 6 (PPG): Bed 1 is undergoing a cocurrent depressurization step to provide purge gas (PPG). The gas recovered during this step is stored in the purge tank (PGT), and later used in the purging step of the PSA cycle. At the same time, bed 2 continues to undergo feed pressurization, and starts producing product if the desired adsorption pressure is achieved prior to initializing the next step.

Step 7 (BD): Bed 1 (B1) is undergoing countercurrent blowdown (BD), while bed 2 (B2) is in the first adsorption step (AD1) at the adsorption pressure (11.72 bars).

Step 8 (PG): Bed 1 is undergoing the purging step, while bed 2 is in the second adsorption step (AD2). The gas used for purging comes from the purge tank (PGT) in FIG. 3.

Step 9 (TEQ): Bed 1 is undergoing the first pressurization step, i.e., bed-to-tank equalization (TEQ), while bed 2 is in the third adsorption step (AD3). The gas used for the first pressurization comes from the equalization tank (ET) in FIG. 3.

Step 10 (EQU & PP): Bed 1 receives gas from bed 2 and is undergoing the second equalization rising step (EQU). In addition, bed 1 is also undergoing feed pressurization (FP) during the second equalization rising step. Simultaneously, bed 2 is undergoing the first equalization falling step (EQ1).

Step 11 (PP and FP): Bed 1 (B1) is undergoing feed pressurization (FP) and product pressurization (PP) simultaneously. The gas for product pressurization comes from the product tank (PT) in FIG. 3. During this interval, bed 2 is undergoing the second equalization falling step (EQ2). The gas recovered during the second equalization falling step is collected in the equalization tank (ET).

Step 12 (FP and AD): Bed 1 continues to undergo feed pressurization, and starts producing product if the desired adsorption pressure is achieved prior to initializing the next step. During this same time interval, bed 2 is undergoing the cocurrent depressurization step to provide purge gas (PPG). The gas recovered in the cocurrent depressurization step is stored in the purge tank (PGT), and later used in the purging step of the PSA cycle.

A summary of the preceding twelve steps is given in Tables 1 and 2 below. In particular, Table 1 summarizes the valve sequence over one complete PSA cycle for the two bed system shown in FIG. 3, and Table 2 gives the respective time intervals and the corresponding status of each bed during one complete PSA cycle. Note from Tables 1 and 2 that the two beds operate in parallel, and that the two bed PSA process handles a continuous feed by utilizing overlapping steps in the PSA cycle.

TABLE 1

Two Bed $H_2$ PSA Valve Switching (O = OPENED, C = CLOSED)

| Step | 1 | 2 | 3 | 4 | 5 | 6 | 7 | 8 | 9 | 10 | 11 | 12 |
|---|---|---|---|---|---|---|---|---|---|---|---|---|
| Bed 1 (B1) | AD1 | AD2 | AD3 | EQ1 | EQ2 | PPG | BD | PG | TEQ | EQU & FP | PP & FP | FP & AD |
| Bed 2 (B2) | BD | PG | TEQ | EQU & FP | PP & FP | FP & AD | AD1 | AD2 | AD3 | EQ1 | EQ2 | PPG |
| Valve No. | | | | | | | | | | | | |
| 1 | O | O | O | C | C | C | C | C | C | O | O | O |
| 2 | C | C | C | O | O | O | O | O | O | C | C | C |
| 3 | C | C | C | C | C | C | O | O | C | C | C | C |
| 4 | O | O | C | C | C | C | C | C | C | C | C | C |
| 5 | O | O | C | C | C | C | O | O | C | C | C | C |
| 6 | C | C | C | O | O | O | C | O | O | O | C | C |
| 7 | C | O | O | O | C | C | C | C | C | O | O | O |
| 8 | O | O | O | C | C | C | C | C | C | C | C | O |

TABLE 1-continued

Two Bed H₂ PSA Valve Switching (O = OPENED, C = CLOSED)

| Step | 1 | 2 | 3 | 4 | 5 | 6 | 7 | 8 | 9 | 10 | 11 | 12 |
|------|---|---|---|---|---|---|---|---|---|----|----|----|
| 9    | C | C | C | C | C | O | O | O | O | C  | C  | C  |
| 10   | C | O | C | C | C | O | C | O | C | C  | C  | O  |
| 11   | C | C | O | C | O | C | C | C | O | C  | O  | C  |
| 12   | C | C | C | C | C | C | C | C | C | C  | O  | C  |
| 13   | C | C | C | C | O | C | C | C | C | C  | C  | C  |

TABLE 2

Two Bed Time Interval and Step Sequence

| Step Number | Time Interval | Bed #1 | Bed #2 |
|---|---|---|---|
| 1 | 0–40 | AD1 | BD |
| 2 | 40–100 | AD2 | PG |
| 3 | 100–200 | AD3 | TEQ |
| 4 | 120–133 | EQ1 | EQU & FP |
| 5 | 133–148 | EQ2 | PP & FP |
| 6 | 148–168 | PPG | FP & FP |
| 7 | 168–208 | BD | AD1 |
| 8 | 208–268 | PG | AD2 |
| 9 | 268–288 | TEQ | AD3 |
| 10 | 288–301 | EQU & FP | EQ1 |
| 11 | 301–316 | PP & FP | EQ2 |
| 12 | 316–336 | FP & AD | PPG |

AD1 = First Adsorption Step
AD2 = Second Adsorption Step
AD3 = Third Adsorption Step
EQ1 = First Equalization Down
EQ2 = Second Equalization Down
PPG = Provide Purge Gas Using Purge Tank (PGT)
BD = Blowdown
PG = Purge
TEQ = First Equalization Up Using Tank (ET)
PP = Product Pressurization Using Product Tank (PT)
FP2 = Feed Pressurization
AD = Adsorption The twelve step PSA cycle described above is illustrative only and is given to demonstrate the superior performance of the two bed PSA process of the present invention. Other PSA cycles may also be used to achieve the superior performance obtained in accordance with the invention without deviating from its scope.

1. Use of VSA 6 Zeolite Adsorbent in the 2 Bed PSA Process of FIGS. 3–5

Table 3 below discloses the operating conditions and PSA process performance using the VSA 6 zeolite in the top layer of each of the adsorbent beds B1 to B2 in the system illustrated in FIG. 3, and carrying out the process in the manner set forth in Tables 1 and 2 above and illustrated in FIGS. 4 and 5. The symbols in Table 3 have the following meanings: TPD=ton (2000 lb) per day of hydrogen, kPa= 1000 Pa=S.I. unit for pressure (1.0 atm.=1.01325 bars= 101.325 kPa), and s=time in seconds.

TABLE 3

Figure 3:
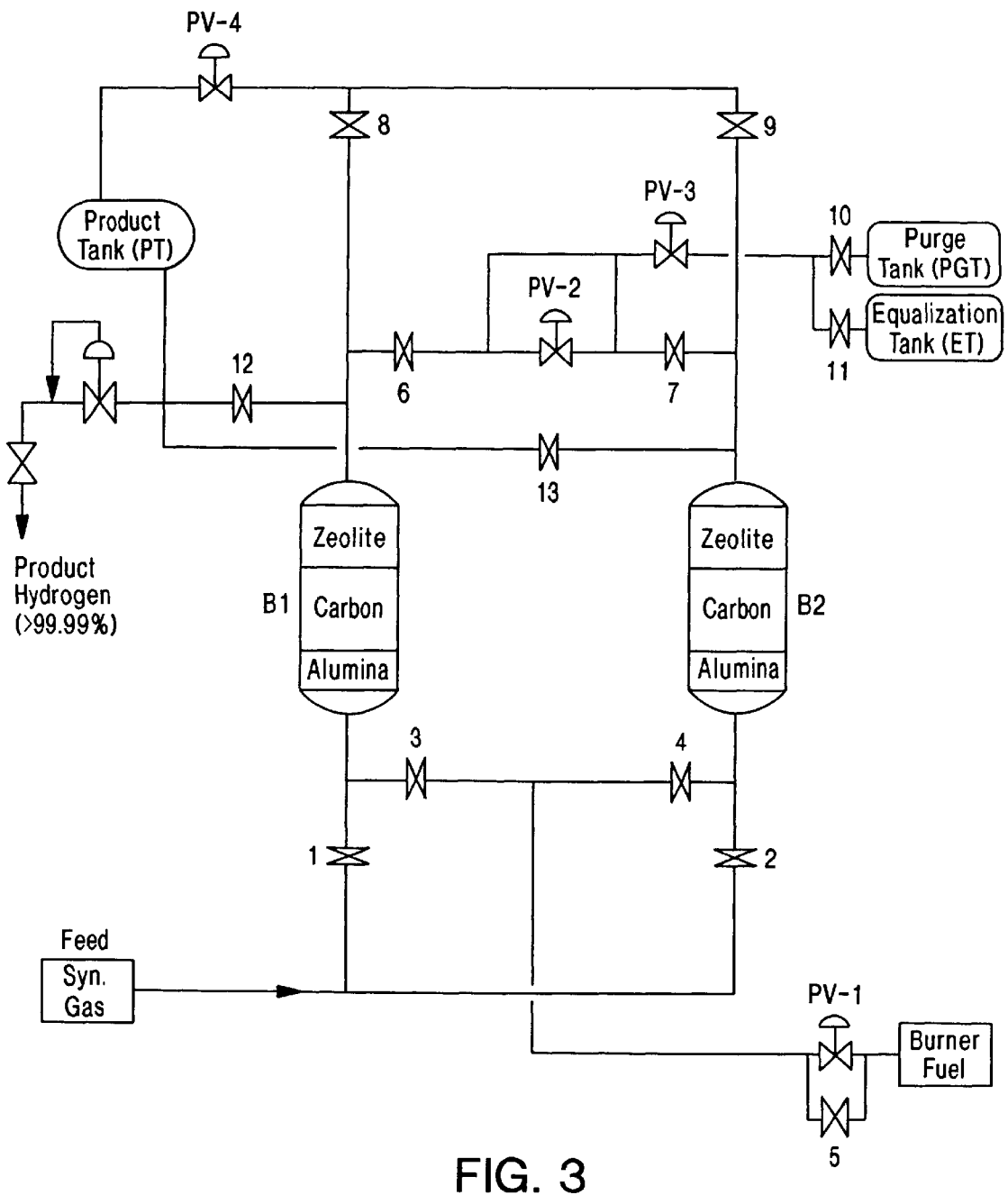
FIG. 3 is a schematic drawing of a two bed PSA system for carrying out the PSA process of the invention.

VSA6 Performance in the Process of FIGS. 3–5*

| | |
|---|---|
| Cycle time(s) | 336 |
| Adsorbent in first layer of Bed | Alumina |
| Amount of alumina (lb/TPD H₂) | 578 |
| Adsorbent in second layer of bed | activated carbon |
| Amount of activated carbon (lb/TPD H₂) | 2862 |
| Adsorbent in third layer of bed | VSA6 zeolite |
| Amount of VSA6 zeolite (lb/TPD H₂) | 1574 |
| High Pressure | 1.171 × 10³ kPa |
| Low Pressure | 1.327 × 10² kPa |
| Feed Rate | 227.6 SCFH |
| H₂ Purity | 99.991% |
| H₂ Recovery | 77.81% |
| Total Bed Size Factor (lb/TPD H₂) | 5014 |
| Feed Temperature | 102° F. |
| Bed Length | 111.25 inches |

*The results shown in Table 3 were obtained from pilot plant data using a feed mixture, on a dry basis, of: 74.45% H₂, 22.20% CO₂, 0.38% CO, 2.12% CH₄ and 0.85% N₂.

B. The Embodiment of FIGS. 6–7

Figure 6:
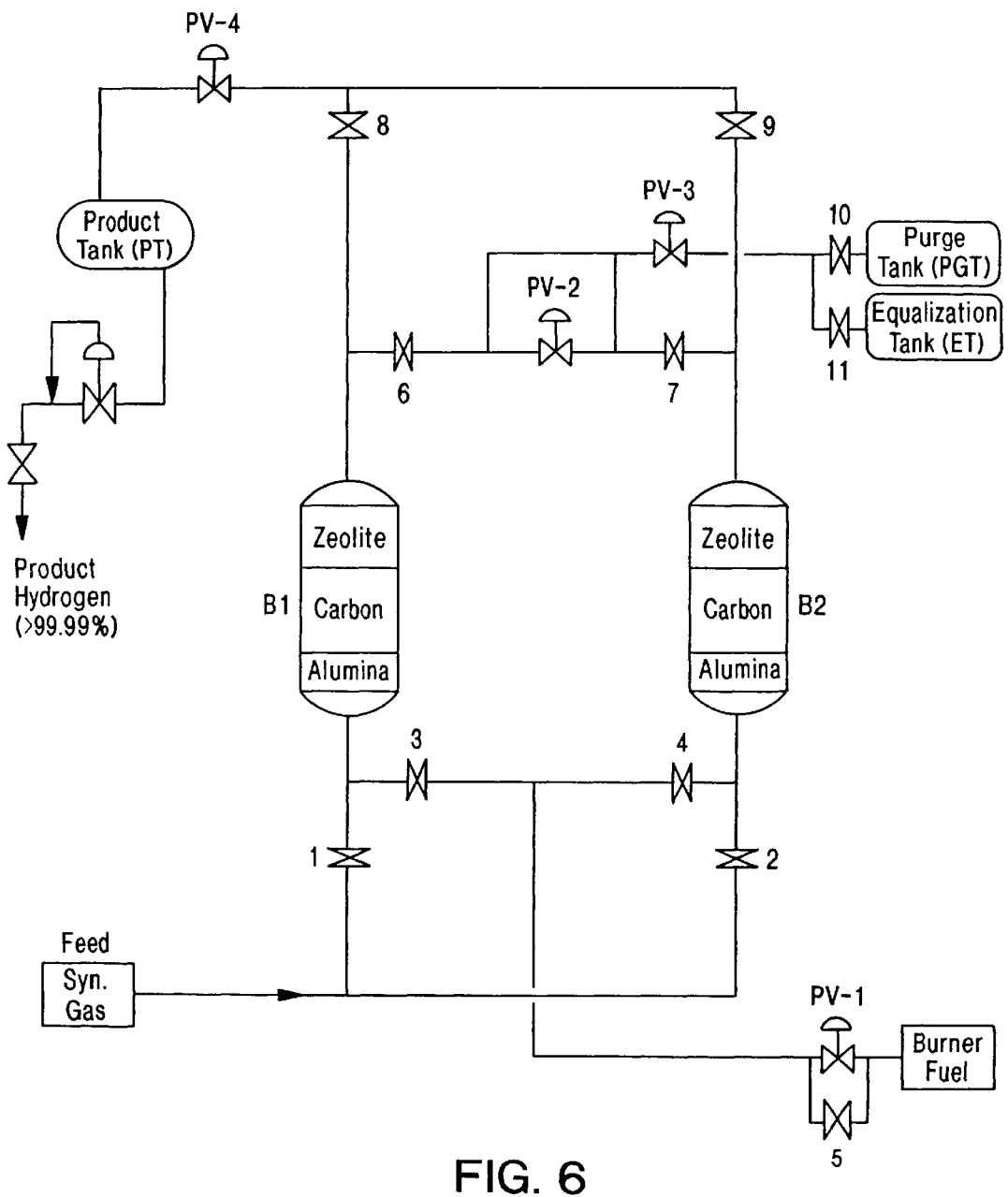
FIG. 6 is a schematic drawing of an alternative two bed PSA system for carrying out the process of the invention.
Figure 7:
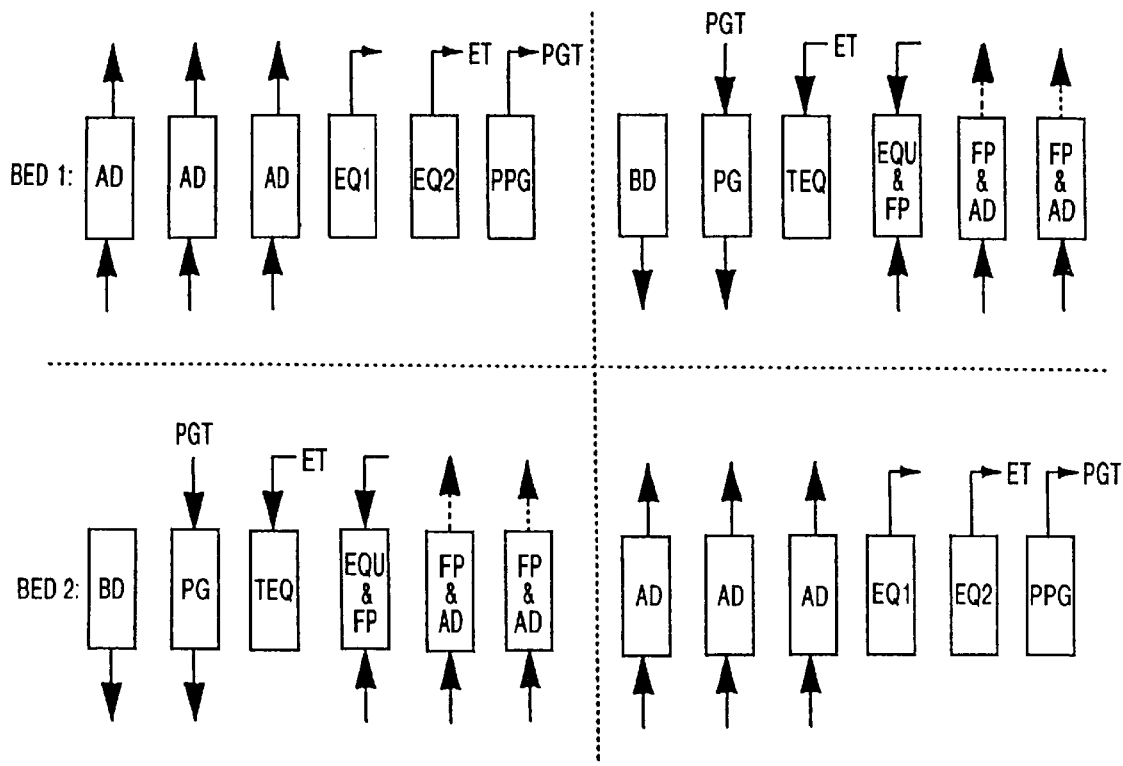
FIG. 7 is a schematic drawing of a 12 step PSA cycle, without product pressurization, in the two bed PSA system of FIG. 6.

FIG. 6 shows an alternative two bed PSA system for use with the PSA cycle depicted in FIG. 7. The key differences between this process and the PSA process described in FIGS. 3–5 are: (1) the absence of the product pressurization step in the cycle, and (2) the absence of conduits connecting the beds to the product tank (PT). The process of FIGS. 6 and 7 gives higher H₂ recovery and lower H₂ purity.

C. The Embodiments of FIGS. 8–10

Figure 8:
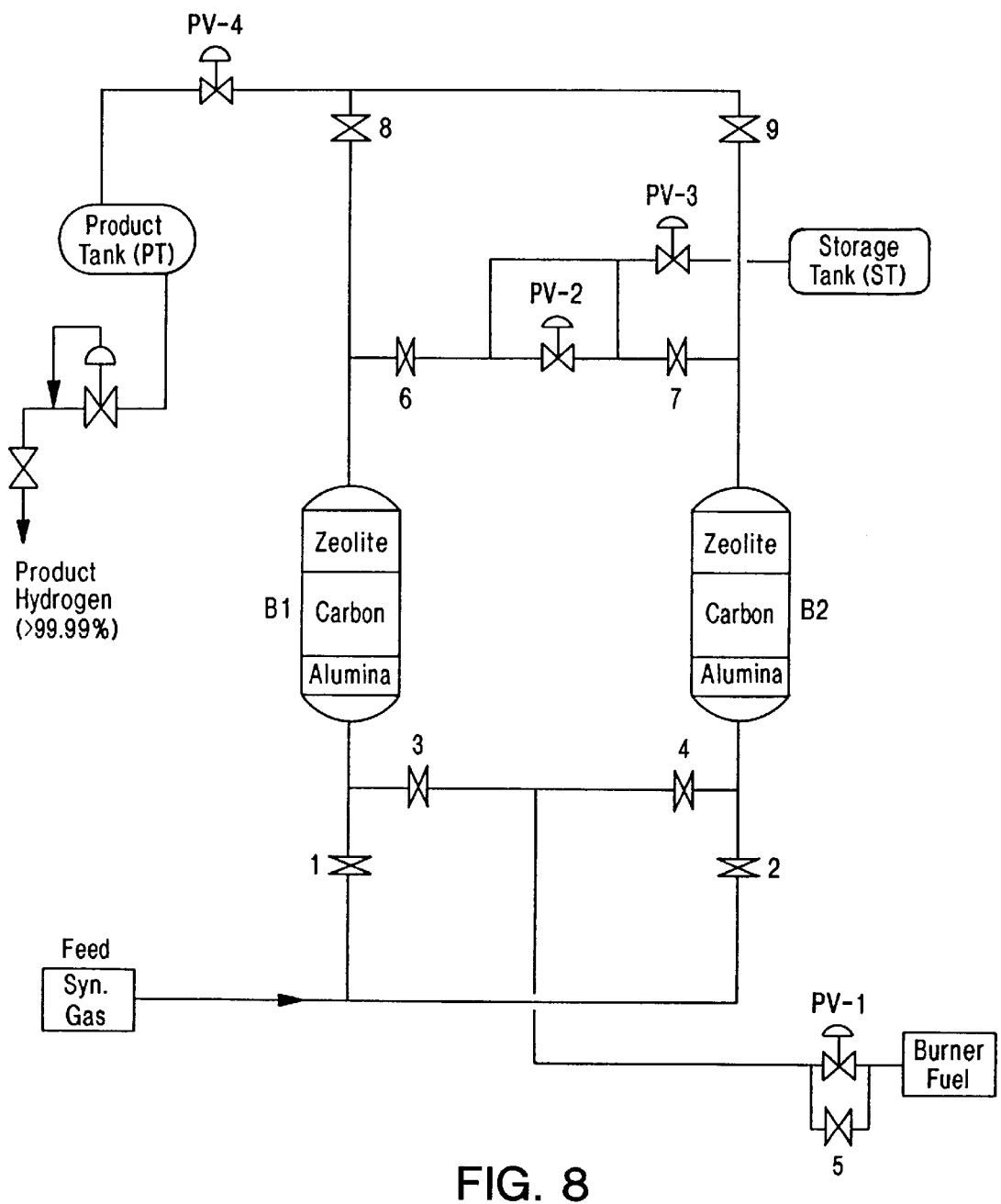
FIG. 8 is a schematic drawing of a further alternative two bed PSA system, in which the purge tank and equalized tank are combined in a storage tank (ST) for carrying out the PSA process of the invention.
Figure 10:
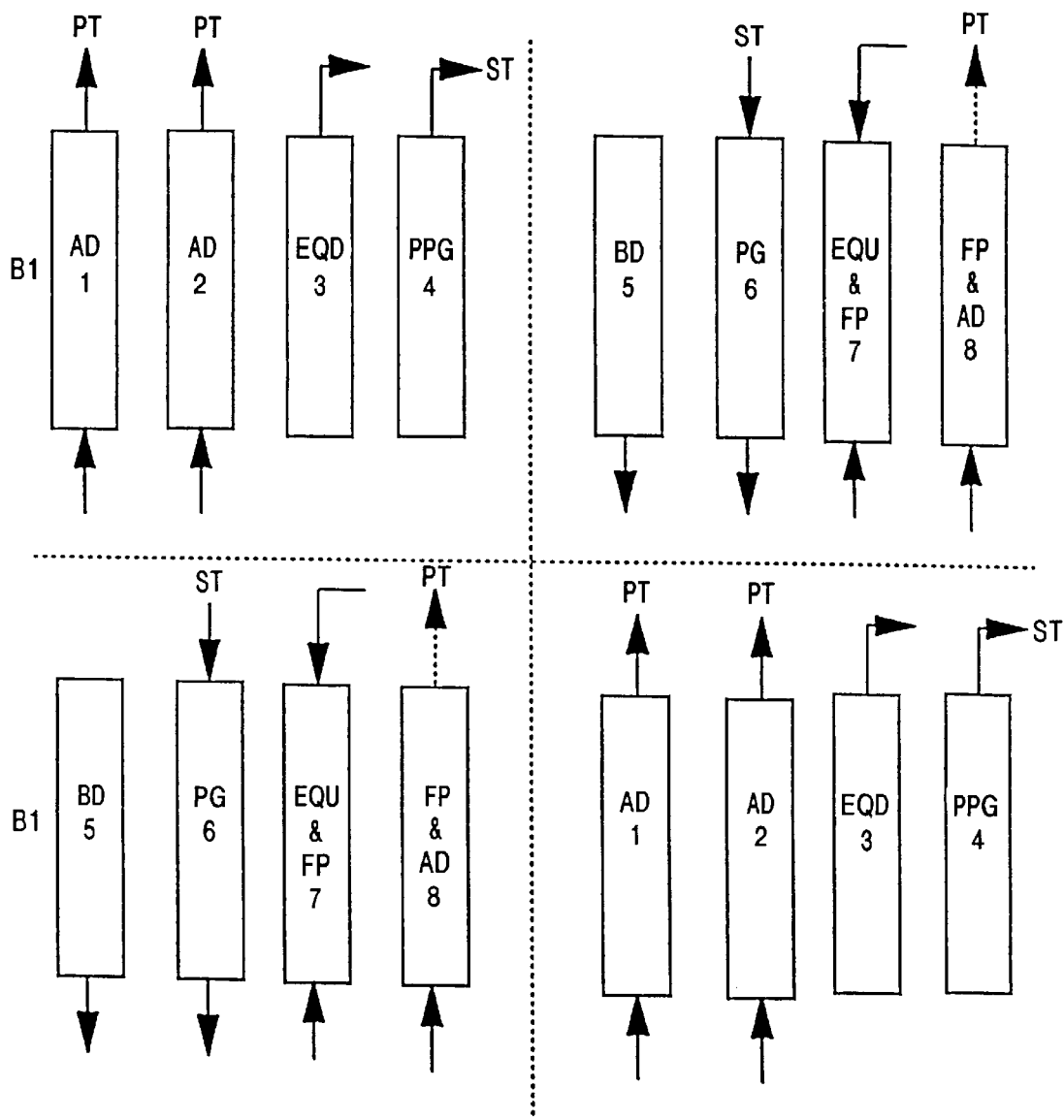
FIG. 10 is a schematic drawing of an 8 step PSA cycle utilizing the two bed system of FIG. 8.
Figure 11:
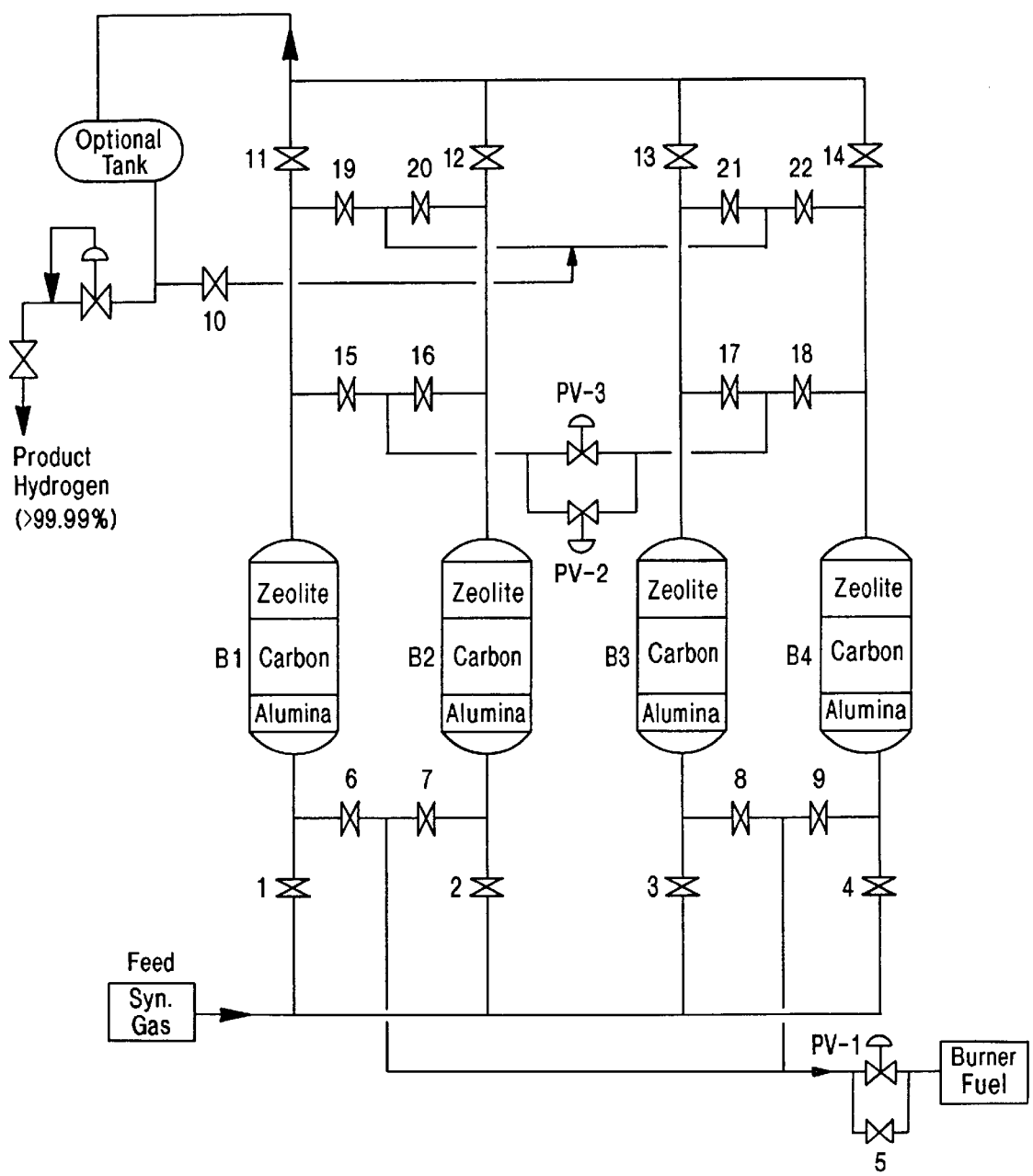
FIG. 11 is a schematic drawing of a four bed adsorbent bed control system for carrying out a PSA process.

FIG. 8 shows a modified two bed PSA system for use with the ten step PSA cycle depicted in FIG. 9. The key differences between this process and the PSA process described in FIGS. 3–5 are: (1) the absence of the product pressurization step in the cycle; (2) the absence of conduits connecting the beds to a purge tank; and (3) the presence of a single storage tank (ST) in place of the purge tank (PGT) and equalization tank (ET) shown in FIG. 3. In addition, FIG. 10 shows an eight step PSA cycle that could be implemented using the PSA system of FIG. 8.

1. Use of VSA6 Adsorbent in the 10-Step 2-Bed PSA Process of FIGS. 8–9

Table 4 below discloses the operating conditions and performance of the two bed PSA process of FIG. 8 utilizing a VSA6 zeolite in the third (top) layer of each of the adsorbent beds B1 to B2, following the PSA cycle of FIG. 9.

TABLE 4

VSA6 Performance in Process of FIGS. 8–9*

| | |
|---|---|
| Cycle time(s) | 360 |
| Adsorbent in first layer of Bed | Alumina |
| Amount of alumina (lb/TPD H₂) | 520.2 |
| Adsorbent in second layer of bed | activated carbon |
| Amount of activated carbon (lb/TPD H₂) | 2575.2 |
| Adsorbent in third layer of bed | VSA6 zeolite |
| Amount of VSA6 zeolite (lb/TPD H₂) | 1416.6 |
| High Pressure | 1.171 × 10³ kPa |
| Low Pressure | 1.327 × 10² kPa |
| Feed Rate | 248.6 SCFH |
| H₂ Purity | 99.9964% |

TABLE 4-continued

VSA6 Performance in Process of FIGS. 8–9*

| | |
|---|---|
| $H_2$ Recovery | 76.3% |
| Total Bed Size Factor (lb/TPD $H_2$) | 4,512.00 |
| Feed Temperature | 84° F. |
| Bed Length | 111.25 inches |

*The results shown correspond to pilot plant data using a feed mixture on a dry basis: 75.02% $H_2$, 21.81% $CO_2$, 0.36% CO, 2.06% $CH_4$ and 0.75% $N_2$.

2. Use of VSA6 Adsorbent in the 2 Bed PSA Process of FIGS. 8 and 10

Table 5 below discloses the operating conditions and performance of the two bed PSA process of FIG. 8 utilizing VSA6 zeolite in the third (top) layer of each of the adsorbent beds B1 to B2 and following the PSA cycle of FIG. 10.

TABLE 5

| | |
|---|---|
| Cycle time(s) | 360 |
| Adsorbent in first layer of Bed | Alumina |
| Amount of alumina (lb/TPD $H_2$) | 642.5 |
| Adsorbent in second layer of bed | activated carbon |
| Amount of activated carbon (lb/TPD $H_2$) | 3180.9 |
| Adsorbent in third layer of bed | VSA6 zeolite |

TABLE 5-continued

| | |
|---|---|
| Amount of VSA6 zeolite (lb/TPD $H_2$) | 1749.8 |
| High Pressure | $1.171 \times 10^3$ kPa |
| Low Pressure | $1.327 \times 10^2$ kPa |
| Feed Rate | 231.4 SCFH |
| $H_2$ Purity | 99.97% |
| $H_2$ Recovery | 66.7% |
| Total Bed Size Factor (lb/TPD $H_2$) | 5,573.2 |
| Feed Temperature | 75° F. |
| Bed Length | 111.25 inches |

*The results shown above correspond to pilot plant data using a feed mixture on a dry basis: 75.02% $H_2$, 21.81% $CO_2$, 0.36% CO, 2.06% $CH_4$ and 0.75% $N_2$.

A summary of the preceding twelve steps is given in Tables 6 and 7 below. In particular, Table 6 summarizes the valve sequence over one complete cycle for the four bed PSA system shown in FIG. 11, and Table 7 gives the respective time intervals and the corresponding status of each bed during one complete PSA cycle. Note from Tables 6 and 7 that the four beds operate in parallel, and during ¼ of the total cycle time one of the beds is in the adsorption step, while the other beds are either undergoing pressure equalization, purge, blowdown, or product pressurization.

TABLE 6

Four Bed H2 PSA Valve Switching (O = OPENED, C = CLOSED)

| Step | 1 | 2 | 3 | 4 | 5 | 6 | 7 | 8 | 9 | 10 | 11 | 12 |
|---|---|---|---|---|---|---|---|---|---|---|---|---|
| Bed 1 (BD1) | AD1 | AD2 | AD3 | EQ1 DN | PPG | EQ2 DN | BD | PG | EQ1 UP | EQ2 UP | PP1 | PP2 |
| Bed 2 (BD2) | BD | PG | EQ1 UP | EQ2 UP | PP1 | PP2 | AD1 | AD2 | AD3 | EQ1 DN | PPG | EQ2 DN |
| Bed 3 (BD3) | EQ1 DN | PPG | EQ2 DN | BD | PG | EQ1 UP | EQ2 UP | PP1 | PP2 | AD1 | AD2 | AD3 |
| Bed 4 (BD4) | EQ2 UP | PP1 | PP2 | AD1 | AD2 | AD3 | EQ1 DN | PPG | EQ2 DN | BD | PG | EQ1 UP |
| Valve No. | | | | | | | | | | | | |
| 1 | O | O | O | C | C | C | C | C | C | C | C | C |
| 2 | C | C | C | C | C | C | O | O | O | C | C | C |
| 3 | C | C | C | C | C | C | C | C | C | O | O | O |
| 4 | C | C | C | O | O | O | C | C | C | C | C | C |
| 5 | O | O | C | O | O | C | O | O | C | O | O | C |
| 6 | C | C | C | C | C | C | O | O | C | C | C | C |
| 7 | O | O | C | C | C | C | C | C | C | C | C | C |
| 8 | C | C | C | O | O | C | C | C | C | C | C | C |
| 9 | C | C | C | C | C | C | C | C | C | O | O | C |
| 10 | C | O | O | C | O | O | C | O | O | C | O | O |
| 11 | O | O | O | C | C | C | C | C | C | C | C | C |
| 12 | C | C | C | C | C | C | O | O | O | C | C | C |
| 13 | C | C | C | C | C | C | C | C | C | O | O | O |
| 14 | C | C | C | O | O | O | C | C | C | C | C | C |
| 15 | C | C | C | C | O | O | C | O | O | C | C | C |
| 16 | C | O | O | C | C | C | C | C | C | C | O | O |
| 17 | C | O | O | C | O | O | C | C | C | C | C | C |
| 18 | C | C | C | C | C | C | C | O | O | C | O | O |
| 19 | C | C | C | O | C | C | C | C | C | O | O | O |
| 20 | C | C | C | O | O | O | C | C | C | O | C | C |
| 21 | O | C | C | C | C | C | O | O | O | C | C | C |
| 22 | O | O | O | C | C | C | O | C | C | C | C | C |

TABLE 7

Time Interval and Step Sequence of the PSA Cycle

| Step Number | Time Interval | BED #1 | BED #2 | BED #3 | BED #4 |
|---|---|---|---|---|---|
| 1 | 0–40 | AD1 | BD | EQ1DN | EQ2UP |
| 2 | 40–125 | AD2/PP1 | PG | PPG | PP1 |
| 3 | 125–150 | AD3/PP2 | EQ1UP | EQ2DN | PP2 |
| 4 | 150–190 | EQ1DN | EQ2UP | BD | AD1 |
| 5 | 190–275 | PPG | PP1 | PG | AD2/PP1 |
| 6 | 270–300 | EQ2DN | PP2 | EQ1UP | AD3/PP2 |
| 7 | 300–340 | BD | AD1 | EQ2UP | EQ1DN |
| 8 | 340–425 | PG | AD2/PP1 | PP1 | PPG |
| 9 | 425–450 | EQ1UP | AD3/PP2 | PP2 | EQ2DN |
| 10 | 450–490 | EQ2UP | EQ1DN | AD1 | BD |
| 11 | 490–575 | PP1 | PPG | AD2/PP1 | PG |
| 12 | 575–600 | PP2 | EQ2DN | AD3/PP2 | EQ1UP |

Figure 12:
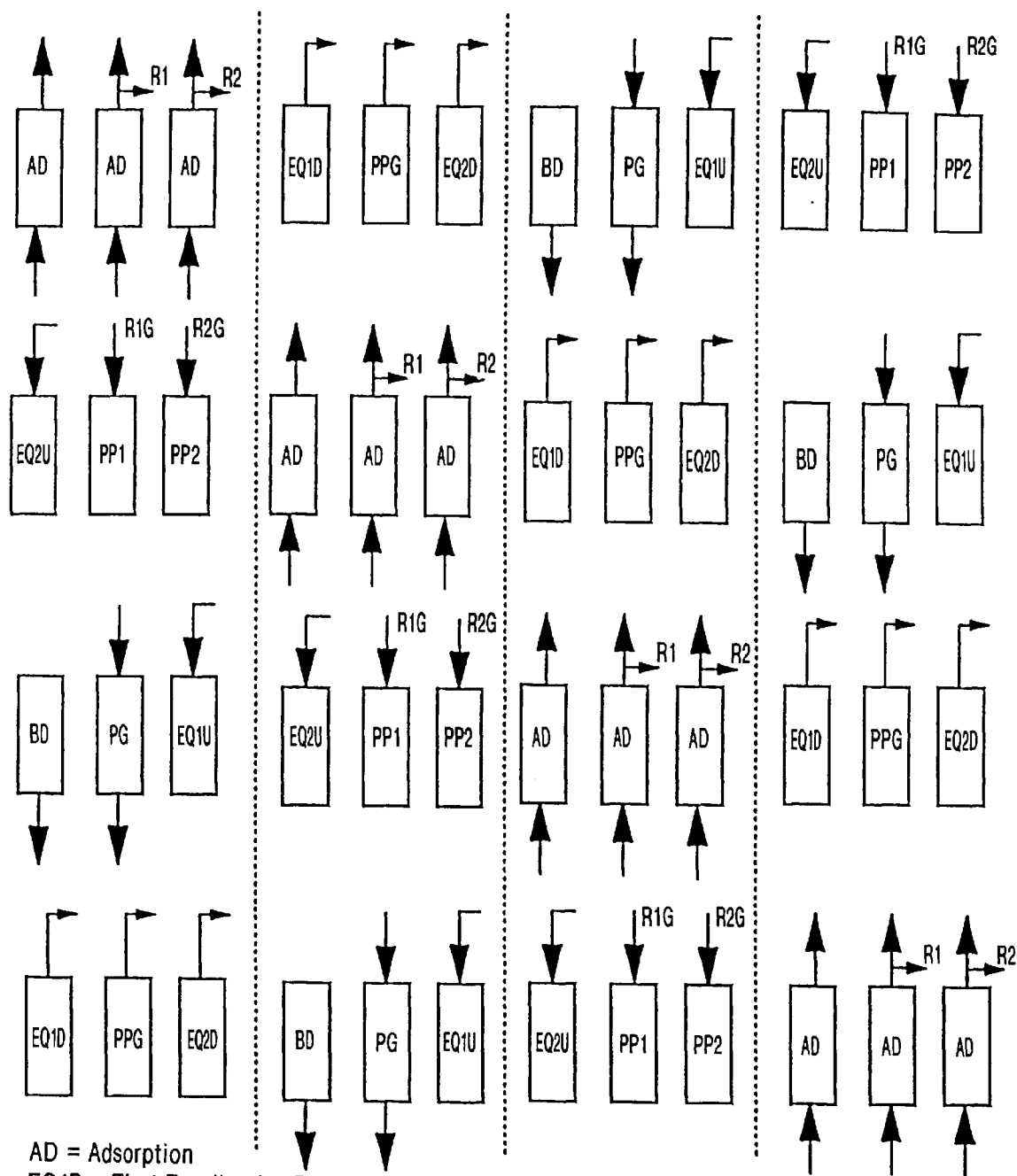
FIG. 12 is a schematic drawing of a 12 step PSA cycle utilizing the four bed control PSA system of FIG. 11.
Figure 13:
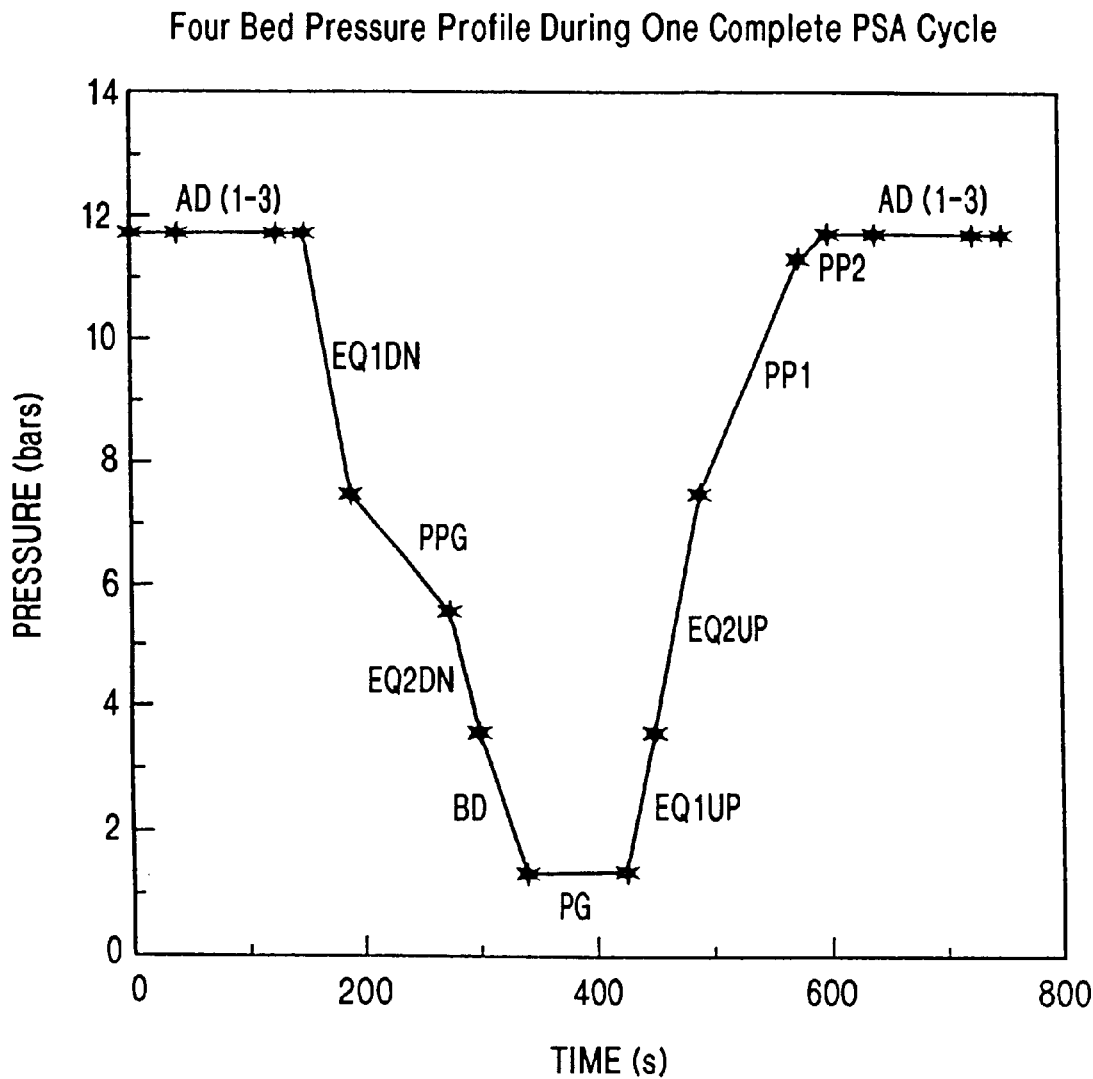
FIG. 13 is a graphic depiction of the bed pressure profile during one complete cycle in the four-bed PSA system of FIG. 11, utilizing the 12 step PSA cycle illustrated in FIG. 12.

AD1 = First Adsorption Step
AD2/PP1 = Second Adsorption Step/First product pressurization
AD3/PP2 = Third Adsorption Step/Second product pressurization
EQ1DN = First Equalization Down
PPG = Provide Purge Gas
EQ2DN = Second Equalization Down
BD = Blowdown
PG = Purge
EQ1UP = First Equalization Up
EQ2UP = Second Equalization Up
PP1 = First Product Pressurization
PP2 = Second Product Pressurization D. The Embodiment of FIGS. 11–13 (Control)

1. Use of VSA6 Adsorbent in the 4 Bed PSA Process of FIGS. 11–13 (Control) Table 8 below discloses the operating conditions and performance of a four bed PSA process of FIGS. 11–13 using VSA6 zeolite in the third (top) layer of each of the adsorbent beds B1 to B4. The results shown below correspond to pilot plant data using a feed mixture on a dry basis: 75.02% $H_2$, 21.81% $CO_2$, 0.36% CO, 2.06% $CH_4$ and 0.75% $N_2$.

TABLE 8

| | |
|---|---|
| Cycle time(s) | 600 |
| Adsorbent in first layer of Bed | Alumina |
| Amount of alumina (lb/TPD $H_2$) | 810.9 |
| Adsorbent in second layer of bed | activated carbon |
| Amount of activated carbon (lb/TPD $H_2$) | 5733.6 |
| Adsorbent in third layer of bed | VSA6 zeolite |
| Amount of VSA6 zeolite (lb/TPD $H_2$) | 3842.3 |
| High Pressure | $1.171 \times 10^3$ kPa |
| Low Pressure | $1.327 \times 10^2$ kPa |
| Feed Rate | 227.2 SCFH |
| $H_2$ Purity | 99.999905% |
| $H_2$ Recovery | 77.5% |
| Total Bed Size Factor (lb/TPD $H_2$) | 10,386.8 |
| Feed Temperature | 78° F. |
| Bed Length | 111.25 inches |

FIG. 14 compares the aforementioned two bed PSA processes using the eight steps (FIGS. 8 and 10), ten steps (FIGS. 8 and 9) and twelve steps (FIGS. 3–5) with the four bed PSA process summarized above. The upper drawing of FIG. 14 compares the $H_2$ purity and recovery using VSA6 zeolite; whereas, the lower diagram of FIG. 14 shows the total bed size factor (TBSF, lb/TPDH$_2$) obtained using each of the aforementioned PSA processes. In addition, Table 9 gives a summary of the novel/differentiating features of PSA processes depicted in FIG. 14.

Table 9 below compares the operating conditions and performance of PSA processes using eight step, ten step, and twelve step PSA cycles and VSA6 zeolite (PH =170 psia).

TABLE 9

| Process Variable | 8 Step/2 Bed | 10 Step/2 Bed | 12 Step/2 Bed Without Prod. Press. | 12 Step/2 Bed With Prod. Press. | 12 Step/4 Bed |
|---|---|---|---|---|---|
| $H_2$ Purity | 99.97% | 99.996% | 99.9% | 99.991% | 99.9999% |
| $H_2$ Recovery | 66.7% | 76.3% | 80% | 77.81% | 77.5% |
| Total Bed Size Factor (lb/TPD $H_2$) | 5573.2 | 4512 | 4876 | 5014 | 10,387 |
| Number of Beds | 2 | 2 | 2 | 2 | 4 |
| Number of Tanks | 2 (ST & PT) | 2 (ST & PT) | 2 (ET & PGT) | 3 (ET, PGT & PT) | 1 (PT) |
| PSA Process | FIG. 8 | FIG. 8 | FIG. 6 | FIG. 3 | FIG. 11 |
| PSA Cycle | FIG. 10 | FIG. 9 | FIG. 7 | FIG. 4 | FIG. 12 |
| Pressure Profile | — | — | — | FIG. 5 | FIG. 13 |
| Table Number | 5 | 4 | — | 3 | 8 |
| Product Press. | No | No | No | Yes | Yes |
| Preference Order | 5 | 3 | 2 | 1 | 4 |

Preference 1 = Most Preferred Process
Product Press. = Product Pressurization
ET = Equalization Tank
PGT = Purge Tank
PT = Product Tank
ST = Storage Tank, i.e., PGT & ET combined as a single tank As shown above in Table 9, the 2 bed PSA process of the present invention has the advantage of a lower bed size factor than 4 bed PSA processes.

Although the foregoing PSA processes have been discussed in relation to $H_2$ production, the key features of this invention may be extended to other separation processes, e.g., $CO_2$ production from synthesis gas or other sources containing $CO_2$ in the feed, or in other PSA processes for the co-production of $H_2$ and CO.

In addition, the zeolite layer/zone of each adsorbent bed may be replaced with multiple layers of different adsorbents. For example, the homogeneous zeolite layer may be substituted by a composite adsorbent layer containing different adsorbent materials positioned in separate zones and employing temperature conditions favoring adsorption performance of the particular adsorbent materials under applicable processing conditions in each zone.

It will be understood that these and other changes may be made in the preferred parameters of the PSA process hereof without departing from the invention. Accordingly, it is intended that the scope of this invention should be determined from the claims appended hereto.

What is claimed is:

1. A two bed pressure swing adsorption process for recovering hydrogen at a purity of over 99% from a feed gas comprising hydrogen and one or more impurities, wherein the process uses a two bed pressure swing adsorption system and comprises:
   a. passing the feed gas through a first adsorption bed to remove one or more impurities;
   b. separately passing effluent gases from the first bed into at least two separate tanks for subsequent purging and pressurization of the two beds;

c. storing a gas mixture in the first of the tanks containing hydrogen in a concentration that is at least 10% higher than the concentration of hydrogen in the gas mixture in the second of the tanks;

d. refluxing the mixture of hydrogen from the second tank in the first adsorption bed during regeneration and depressurization steps therein;

e. refluxing the mixture of hydrogen from the first tank in the first adsorption bed during said regeneration and depressurization steps therein;

f. simultaneously and non-concurrently performing steps (a) to (e) in a second bed; and g. recovering hydrogen as a product gas stream.

2. The process of claim 1, wherein the feed gas contains $H_2$, CO, $CO_2$, $CH_4$, $N_2$, and $H_2O$.

3. The process of claim 1, wherein the feed gas is continuously fed into the pressure swing adsorption system.

4. The process of claim 1, wherein the time for one full cycle is between about 100 and about 400 seconds.

5. The process of claim 1, further comprising at least one bed to bed equalization step.

6. The process of claim 1, wherein the pressurization comprises, in sequence:

i. equalization up;

ii. equalization up and feed pressurization;

iii. product pressurization using hydrogen gas having a purity of over 99% and feed pressurization; and iv. feed pressurization.

7. The process of claim 1, wherein the depressurization comprises, in sequence:

i. equalization down to said second bed;

ii. equalization down to the first tank, iii. equalization down to the second tank; and iv blowdown.

8. The process of claim 1, wherein the first and second beds each comprises an alumina layer at the feed end of the bed, a zeolite layer at the product end of the bed, and a carbon layer between the alumina layer and the zeolite layer.

9. The process of claim 8, wherein the zeolite layer comprises a CaX zeolite or a VSA6 zeolite.

10. A pressure swing adsorption process for recovering hydrogen at a purity of over 99% from a feed gas comprising hydrogen and one or more impurities, wherein the process uses a pressure swing adsorption system having two or more adsorption beds and comprises:

a. passing the feed gas through an adsorption bed to remove one or more impurities;

b. collecting effluent gases from the beds in at least two different storage tanks resulting in at least one storage tank having a hydrogen concentration that is at least 10% higher than the hydrogen concentration of at least one of the other storage tanks;

c. refluxing a gas mixture containing increasing purities of hydrogen from the different storage tanks in an adsorption bed during regeneration steps therein;

d. recovering hydrogen having a purity of over 99%.

11. The process of claim 10, wherein the feed gas is continuously fed into the pressure swing adsorption system.

12. The process of claim 10, wherein the time for one adsorption and desorption full cycle is between about 100 and about 400 seconds.

13. The process of claim 10, further comprising at least one bed to bed equalization step.

14. The process of claim 10, wherein the process includes pressurization steps which comprise, in sequence:

i. equalization up;

ii. equalization up and feed pressurization;

iii. product pressurization using hydrogen gas having a purity of over 99.5% and feed pressurization; and iv. feed pressurization.

15. The process of claim 10, wherein the process includes depressurization steps which comprise in order:

i. equalization down;

ii. equalization down to the first storage tank;

iii. equalization down to the second storage tank; and iv. blowdown.

16. The process of claim 10, wherein the process results in a hydrogen recovery of over 75% when said over 99.99%.

17. The process of claim 10, wherein the first and second beds each comprises an alumina layer at the feed end of the bed, a zeolite layer at the product end of the bed, and a carbon layer between the alumina layer and the zeolite layer.

18. The process of claim 17, wherein the zeolite layer comprises a CaX zeolite or a VSA6 zeolite.

19. The process of claim 10, wherein the feed gas impurities comprise nitrogen, carbon monoxide, carbon dioxide, methane and water.

* * * * *